United States Patent
Chiu et al.

(10) Patent No.: US 10,971,872 B2
(45) Date of Patent: Apr. 6, 2021

(54) NETWORK SHARING SYSTEM

(71) Applicant: Askey Computer Corp., New Taipei (TW)

(72) Inventors: Tai-Kuang Chiu, New Taipei (TW); Ying-Kun Tsao, New Taipei (TW); Chung-Min Wei, New Taipei (TW)

(73) Assignee: ASKEY COMPUTER CORP., New Taipei (TW)

( * ) Notice: Subject to any disclaimer, the term of this patent is extended or adjusted under 35 U.S.C. 154(b) by 0 days.

(21) Appl. No.: 16/456,126

(22) Filed: Jun. 28, 2019

(65) Prior Publication Data

US 2020/0169049 A1 May 28, 2020

(30) Foreign Application Priority Data

Nov. 23, 2018 (TW) .................................. 107141968

(51) Int. Cl.
*H01R 24/64* (2011.01)
*H01R 24/56* (2011.01)
(Continued)

(52) U.S. Cl.
CPC .............. *H01R 24/64* (2013.01); *H01R 24/56* (2013.01); *H01R 24/76* (2013.01); *H04L 12/10* (2013.01);
(Continued)

(58) Field of Classification Search
CPC ........ H01R 24/64; H01R 24/56; H01R 24/76; H04L 12/10; G01D 4/004; H01L 23/3677
See application file for complete search history.

(56) References Cited

U.S. PATENT DOCUMENTS

| | | | |
|---|---|---|---|
| 6,373,348 B1* | 4/2002 | Hagerup | H01L 23/3677 |
| | | | 257/E23.105 |
| 6,650,249 B2* | 11/2003 | Meyer | G01D 4/004 |
| | | | 340/870.11 |

(Continued)

FOREIGN PATENT DOCUMENTS

| | | |
|---|---|---|
| CN | 201315708 | 9/2009 |
| CN | 201315708 Y | 9/2009 |

(Continued)

OTHER PUBLICATIONS

European Office Action dated Dec. 4, 2019, issued in application No. 19189336.1-1216.

*Primary Examiner* — Jean F Duverne
(74) *Attorney, Agent, or Firm* — McClure, Qualey & Rodack, LLP

(57) ABSTRACT

A network sharing system includes an outdoor wireless transceiver device, an indoor network sharing device, and a high-speed Ethernet transmission cable. The outdoor wireless transceiver device includes a high-frequency network transceiver module and a first Ethernet port and the high-frequency network transceiver module is connected to the first Ethernet port and is configured to receive a high-frequency network signal. The indoor network sharing device includes a processing module and a second Ethernet port. The high-speed Ethernet transmission cable has a transmission rate above 1 giga bits per second (Gbps), two ends of the high-speed Ethernet transmission cable are respectively connected to a first RJ45 connector and a second RJ45 connector, the high-speed Ethernet transmission cable is provided with a flat cable segment, the first RJ45 connector is connected to the first Ethernet port, and the second RJ45 connector is connected to the second Ethernet port.

6 Claims, 7 Drawing Sheets

(51) Int. Cl.
*H01R 24/76* (2011.01)
*H04L 12/10* (2006.01)

(52) U.S. Cl.
CPC ...... *H01R 2201/02* (2013.01); *H01R 2201/04* (2013.01)

(56) References Cited

U.S. PATENT DOCUMENTS

| | | | |
|---|---|---|---|
| 10,459,411 B2 * | 10/2019 | Bernheim | G05B 13/021 |
| 2015/0017930 A1 | 1/2015 | Rivera | |
| 2015/0301544 A1 | 10/2015 | Lonvick et al. | |
| 2016/0197434 A1 | 7/2016 | Lett | |

FOREIGN PATENT DOCUMENTS

| | | |
|---|---|---|
| CN | 105789951 A | 7/2016 |
| EP | 2770672 A2 | 8/2014 |
| EP | 3132593 A1 | 2/2017 |
| TW | 200635853 A | 10/2006 |
| WO | 2009/054476 A1 | 3/2011 |
| WO | 2018/175615 A1 | 9/2018 |
| WO | 2018175615 A1 | 9/2018 |

\* cited by examiner

NETWORK SHARING SYSTEM

CROSS-REFERENCE TO RELATED APPLICATION

This non-provisional application claims priority under 35 U.S.C. § 119(a) to Patent Application No. 107141968 filed in Taiwan, R.O.C. on Nov. 23, 2018, the entire contents of which are hereby incorporated by reference.

BACKGROUND

Technical Field

The instant disclosure relates to a network system, and in particular, to a network sharing system.

Related Art

As the communications technologies become developed and popularized, network connections have become an indispensable part of public institutions, families, and individuals. Generally, most people may install a network sharer indoor, to enable a plurality of communications device (for example, a notebook computer, a smartphone, or a tablet computer) within a specific range to be connected to the network sharer in a wired or wireless manner, so as to be connected to the Internet through the network sharer.

At present, the network sharer may also be connected to a wireless network transceiver, to wirelessly receive an external network signal through the wireless network transceiver and then to perform network sharing through a wireless sharer, in addition to being connected to a wired broad band to perform network sharing. However, in actual use of this method, if the wireless network transceiver is installed indoor, the problem of poor signal quality is easy to occur. If the wireless network transceiver is installed outdoor, extra construction (for example, breaking a door or window, or drilling a wall) is needed to perform wiring, resulting in an increase in costs and influences on an esthetic appearance due to damages to indoor decorations.

SUMMARY

In view of the above, an embodiment provides a network sharing system, including an outdoor wireless transceiver device, an indoor network sharing device, and a high-speed Ethernet transmission cable. The outdoor wireless transceiver device includes a high-frequency network transceiver module and a first Ethernet port, and the high-frequency network transceiver module is connected to the first Ethernet port and is configured to receive a high-frequency network signal. The indoor network sharing device includes a processing module and a second Ethernet port and the processing module is connected to the second Ethernet port. The high-speed Ethernet transmission cable has a transmission rate above 1 giga bits per second (Gbps), two ends of the high-speed Ethernet transmission cable are respectively connected to a first RJ45 connector and a second RJ45 connector, the high-speed Ethernet transmission cable is provided with a flat cable segment, the first RJ45 connector is connected to the first Ethernet port, and the second RJ45 connector is connected to the second Ethernet port.

In this way, in the network sharing system according to the embodiment of the instant disclosure, the high-speed Ethernet transmission cable is provided with a flat cable segment, so that the high-speed Ethernet transmission cable can directly pass through a door or window to connect the outdoor wireless transceiver device and the indoor network sharing device, and the door or window can be opened or closed normally. Therefore, extra construction (for example, breaking the door or window, or drilling a wall) is not needed, thereby reducing the costs and maintaining the esthetic appearance of the indoor decorations. In addition, the high-speed Ethernet transmission cable according to the embodiment of the instant disclosure has a transmission rate above 1 Gbps, and can produce a high-speed transmission efficiency with respect to the high-frequency network signal (for example, 5G signal, or 802.11ax or 802.11ad signal).

DETAILED DESCRIPTION

Figure 1:
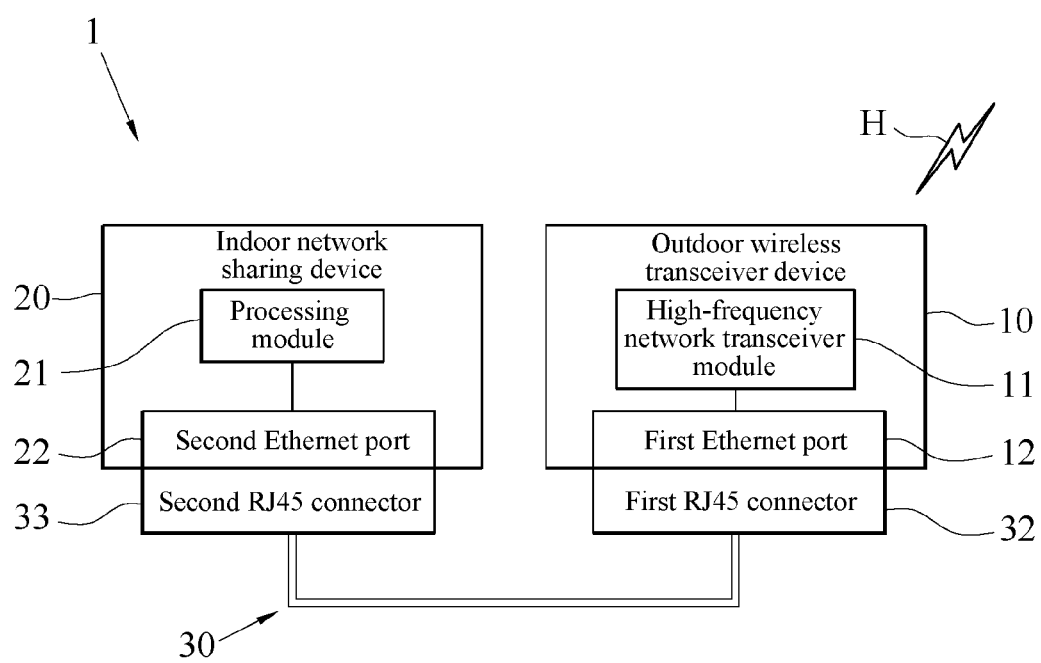
FIG. 1 is a system block diagram of a network sharing system according to an embodiment of the instant disclosure.

As shown in FIG. 1, in this embodiment, a network sharing system 1 includes an outdoor wireless transceiver device 10, an indoor network sharing device 20, and a high-speed Ethernet transmission cable 30. The outdoor wireless transceiver device 10 includes a high-frequency network transceiver module 11 and a first Ethernet port 12. The high-frequency network transceiver module 11 is connected to the first Ethernet port 12. The indoor network sharing device 20 includes a processing module 21 and a second Ethernet port 22. The processing module 21 is connected to the second Ethernet port 22. The high-speed Ethernet transmission cable 30 is configured to connect the first Ethernet port 12 and the second Ethernet port 22, to enable the outdoor wireless transceiver device 10 and the indoor network sharing device 20 to transmit signals to each other through the high-speed Ethernet transmission cable 30.

Figure 2:
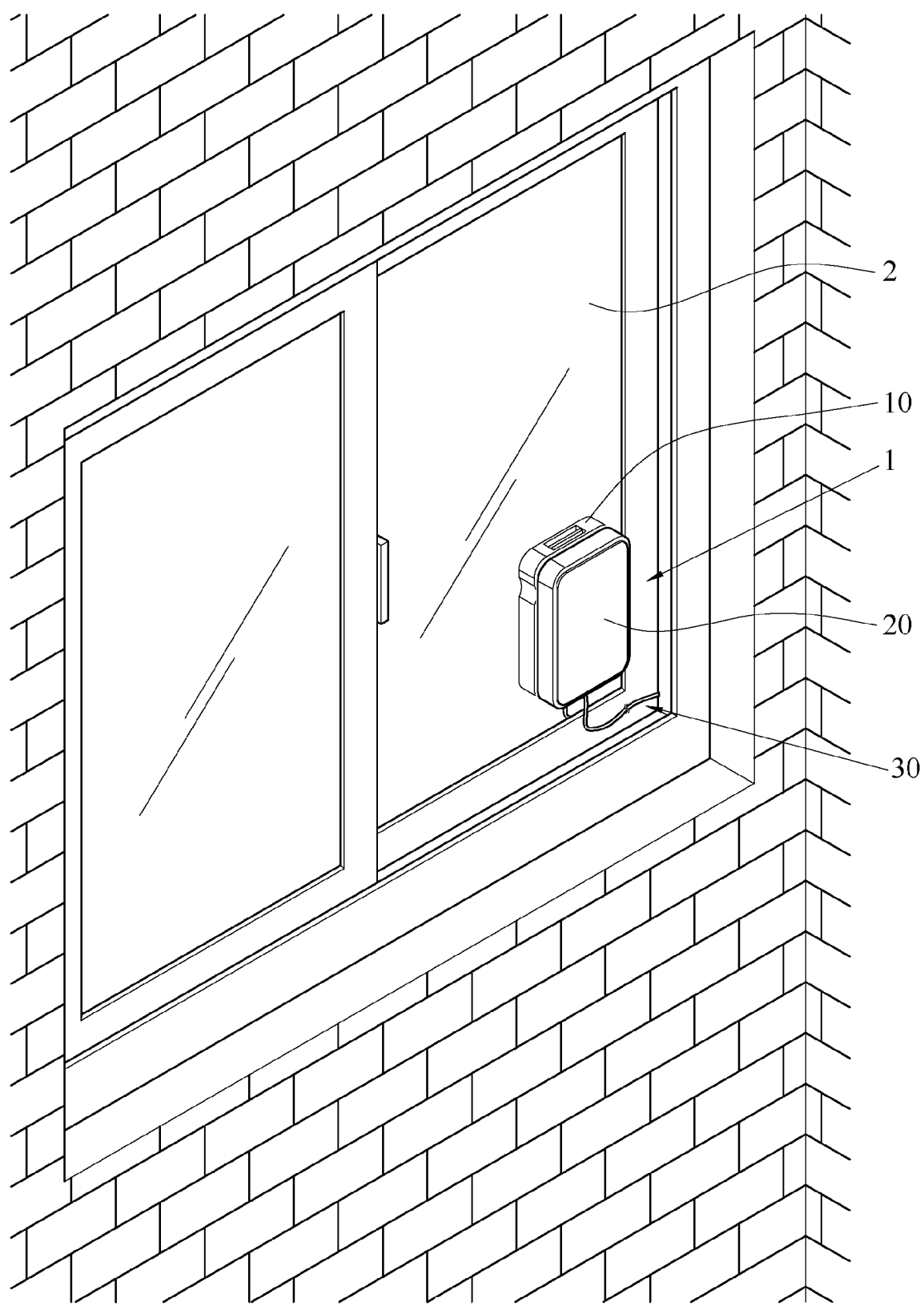
FIG. 2 is a schematic installation diagram of a network sharing system according to an embodiment of the instant disclosure.
Figure 3:
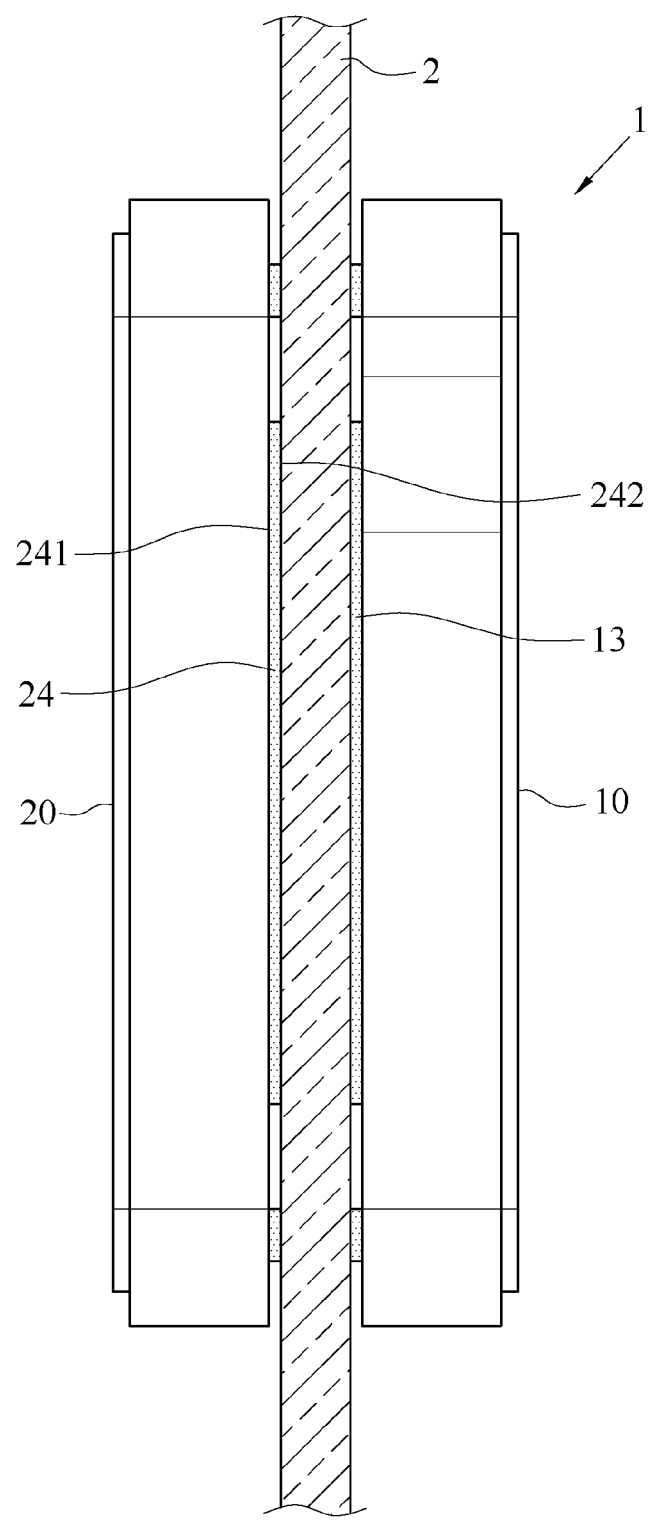
FIG. 3 is a side view of a network sharing system according to an embodiment of the instant disclosure.

As shown in FIG. 1, the indoor network sharing device 20 is installed at a predetermined position indoor, for example, installed on a wall, a desk, or a window inside a building. As shown in FIG. 2 and FIG. 3, in this embodiment, the indoor network sharing device 20 is installed on an inner surface of a window 2. The indoor network sharing device 20 may be provided with a nano tape 24. For example, the nano tape 24 may be, but not limited to, a gecko tape. The nano tape 24 is provided with a bonding surface 241 and an absorption surface 242 opposite to each other. The bonding surface 241 is fixedly disposed on (for example, fixedly adhered to) a surface of the indoor network sharing device 20. The absorption surface 242 of the nano tape 24 may be provided with a nano structure, for example, be covered with nano whiskers or nano fibers, to enable the indoor network sharing device 20 to cling to the inner surface of the window 2 through the absorption surface 242 of the nano tape 24, so that a Van der Waals force is generated between the absorption surface 242 and the inner surface of the window 2, to achieve an absorption fixing effect. In this way, the indoor network sharing device 20 can be easily and rapidly installed at the predetermined position by means of absorption fixing of the nano tape 24, and when the indoor network sharing device 20 needs to be disassembled or reinstalled at another position, the indoor network sharing device 20 can be easily separated from the window without leaving any traces merely by applying a force to get the indoor network sharing device 20 away from the predetermined position, thereby achieving more convenient use without extra construction.

Figure 6:
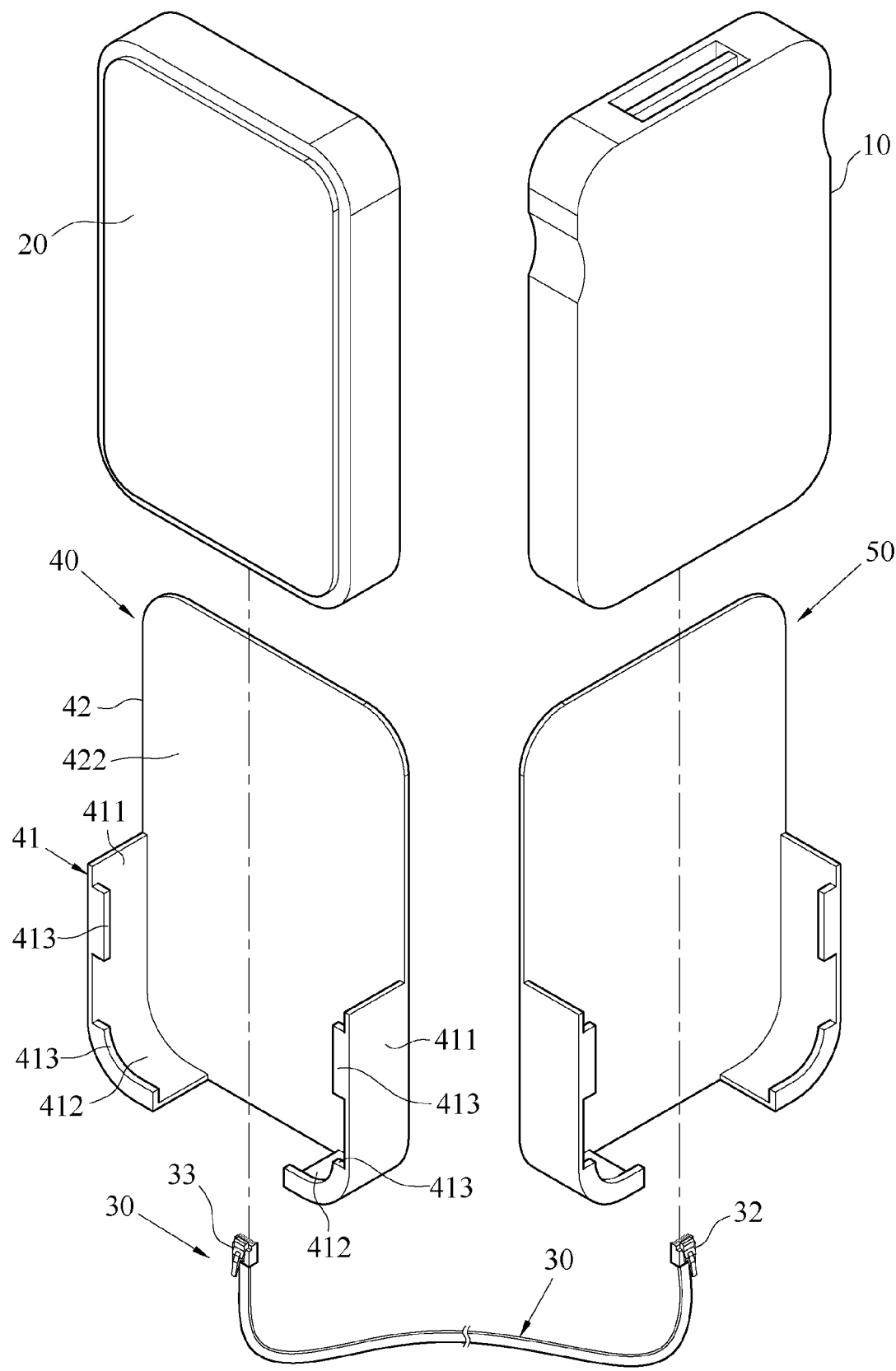
FIG. 6 is a three-dimensional exploded view of a network sharing system according to another embodiment of the instant disclosure.
Figure 7:
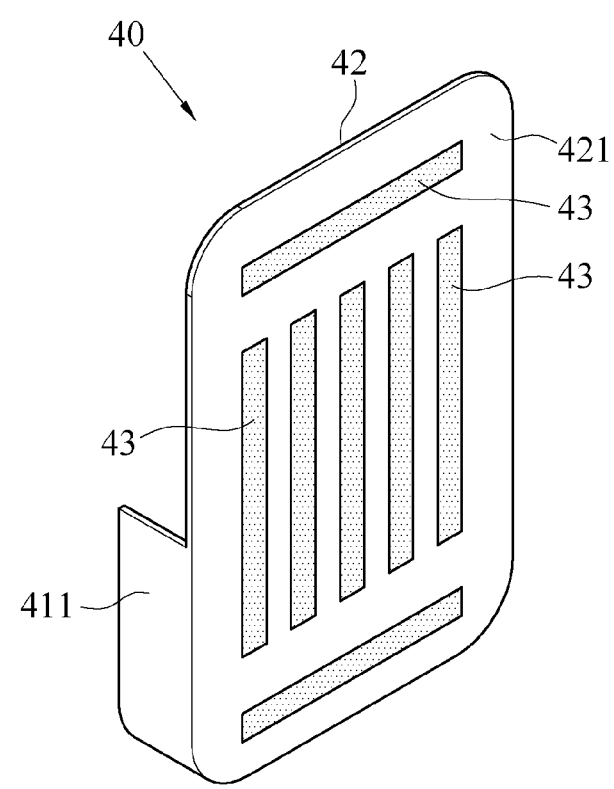
FIG. 7 is a schematic diagram of a fixing member of a network sharing system according to an embodiment of the instant disclosure.

However, the foregoing embodiment is merely an example. In some embodiments, the indoor network sharing device 20 may alternatively be installed at the predetermined position indoor through other methods (for example, methods such as locking, adhering, or magnetic absorbing). As shown in FIG. 6 and FIG. 7, in this embodiment, the indoor network sharing device 20 is installed on a fixing member 40. The fixing member 40 is provided with a stop portion 41. The indoor network sharing device 20 abuts against the stop portion 41 to be positioned. In this example, the fixing member 40 includes a back plate 42. The back plate 42 is provided with a fixing surface 421 and a mounting surface 422 opposite to each other. The fixing surface 421 is configured to be fixed to the predetermined position indoor. The stop portion 41 includes two side plates 411 and a plurality of stop plates 413. The two side plates 411 extend from the mounting surface 422 and are arranged at an interval, one end of each side plate 411 is provided with a bent section 412, and the plurality of stop plates 413 extends inward from an edge that is away from the back plate 42 and that is of each side plate 411, so that the indoor network sharing device 20 can be inserted between the two side plates 411, to abut between the back plate 42, the two side plates 411, and the stop plate 413 to be positioned. When the indoor network sharing device 20 needs to be disassembled or reinstalled at another position, the indoor network sharing device 20 can be extracted out of the fixing member 40 by applying a force.

In some embodiments, the fixing member 40 can be installed at any position indoor. As shown in FIG. 7, in this embodiment, the fixing surface 421 of the back plate 42 of the fixing member 40 may also be provided with at least one nano tape 43 (a plurality of nano tapes 43 is provided herein, but the instant disclosure is not limited thereto). The structure of the nano tape 43 may be similar to that of the nano tape 24, and details are not described herein. In this way, the fixing member 40 may be fixed to any position indoor through absorption of the nano tape 43, for the indoor network sharing device 20 to be installed on, and the fixing member 40 can be altered to be absorbed to any position anytime. In some embodiments, the indoor network sharing device 20 may alternatively be directly placed on a desktop or ground without being fixed by a mechanism.

As shown in FIG. 2 and FIG. 3, the outdoor wireless transceiver device 10 is installed at a predetermined position outdoor, for example, installed on an outer wall or outside a window of a building, and is configured to wirelessly receive an external network signal. In this embodiment, the outdoor wireless transceiver device 10 is installed on an outer surface of the window 2. A surface of the outdoor wireless transceiver device 10 may be provided with a nano tape 13.

The structure of the nano tape 13 may be similar to that of the nano tape 24 of the indoor network sharing device 20, and details are not described herein, so that the outdoor wireless transceiver device 10 can be fixed to the outer surface of the window 2 through absorption of the nano tape 13, achieving convenience such as rapid installation without construction.

However, the foregoing embodiment is merely an example. In some embodiments, the outdoor wireless transceiver device 10 may similarly be installed at the predetermined position outdoor through other methods (for example, methods such as locking, adhering, or magnetic absorbing). As shown in FIG. 6, the outdoor wireless transceiver device 10 may be installed on a fixing member 50. The structure of the fixing member 50 may be similar to that of the fixing member 40. The fixing member 50 may be installed at a predetermined position outdoor, so that the outdoor wireless transceiver device 10 may abut against the fixing member 50 to be positioned.

As shown in FIG. 1, the high-frequency network transceiver module 11 of the outdoor wireless transceiver device 10 is configured to receive an external high-frequency network signal H. The high-frequency network signal H is a high-frequency (for example, 1 GHz to 300 GHz) network signal. For example, the high-frequency network transceiver module 11 may be a 5G transceiver module. Specifically, the high-frequency network transceiver module 11 may be provided with a 5G transceiver antenna, to wirelessly receive a 5G network signal, where the 5G network signal has a frequency ranging from 1 GHz to 100 GHz, and is capable of supporting a data transmission rate above 1 Gbps. Alternatively, in another embodiment, the high-frequency network transceiver module 11 may alternatively be a high-frequency Wi-Fi transceiver module. For example, the high-frequency network transceiver module 11 may be a 802.11ax or 802.11ad transceiver module and be provided with a 802.11ax or 802.11ad transceiver antenna, to wirelessly receive a 802.11ax or 802.11ad network signal, where the 802.11ax network signal has frequencies of 2.4 GHz and 5 GHz, the 802.11ad network signal has a frequency of 60 GHz, and the 802.11ax network signal and the 802.11ad network signal are capable of supporting a data transmission rate above 1 Gbps.

Figure 4:
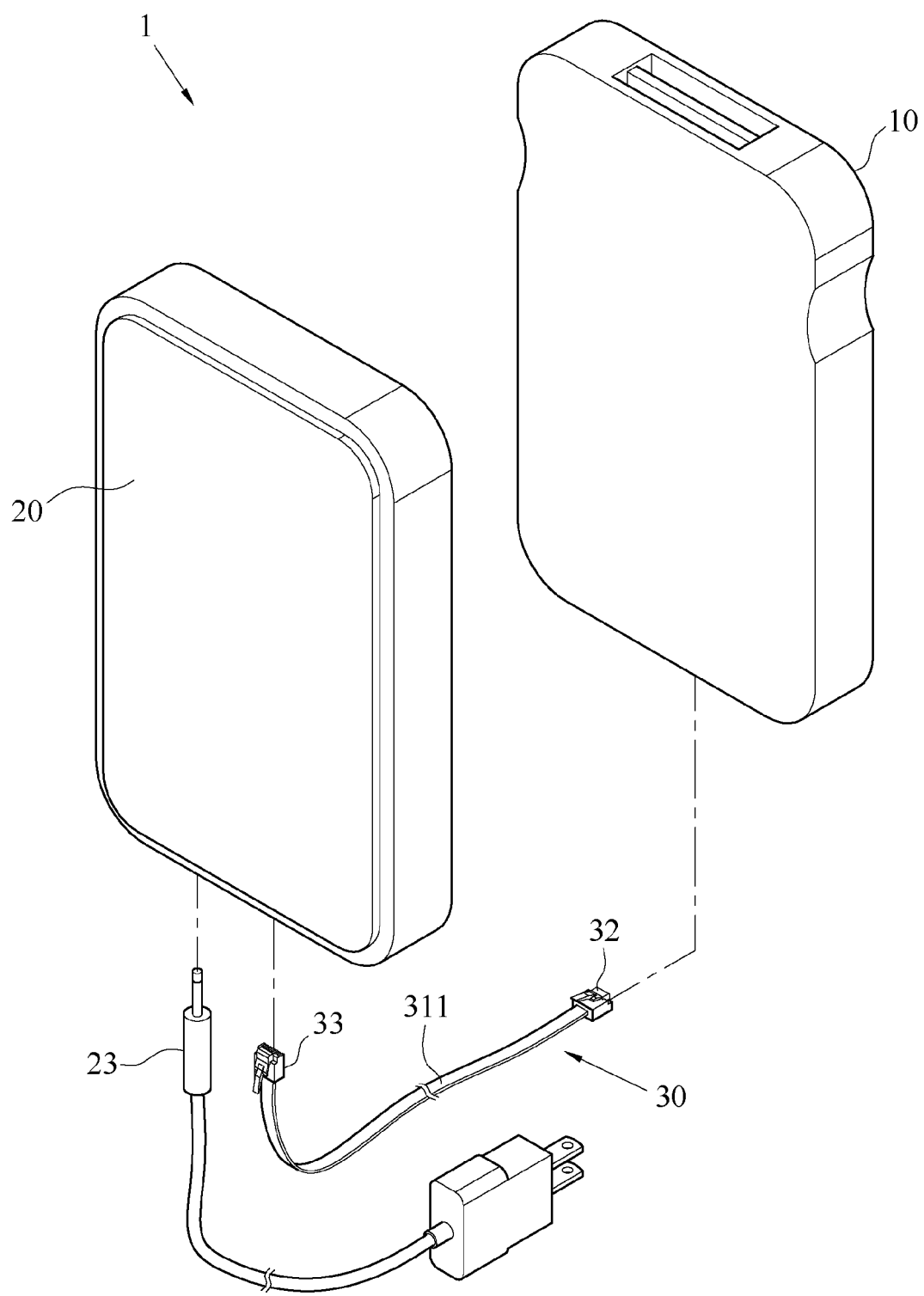
FIG. 4 is a three-dimensional exploded view of a network sharing system according to an embodiment of the instant disclosure.

Referring to FIG. 1 and FIG. 4, the high-speed Ethernet transmission cable 30 has a transmission rate above 1 Gbps, to support a data transmission rate of the high-frequency network signal H. In this embodiment, two ends of the high-speed Ethernet transmission cable 30 are respectively connected to a first RJ45 connector 32 and a second RJ45 connector 33. The high-speed Ethernet transmission cable 30 may be a Category 5 enhanced (Cat 5e) network cable, to support a transmission rate above 1 Gbps. The high-speed Ethernet transmission cable 30 may alternatively be a Category 6A (Cat 6A) network cable, to support a transmission rate of maximally up to 10 Gbps. However, the foregoing embodiment is only an example. Actually, the high-speed Ethernet transmission cable 30 may also be a cable supporting a transmission rate above 1 Gbps.

As shown in FIG. 1 and FIG. 4, the high-speed Ethernet transmission cable 30 is connected between the first RJ45 connector 32 and the second RJ45 connector 33, the first RJ45 connector 32 is connected to the first Ethernet port 12 of the outdoor wireless transceiver device 10, and the second RJ45 connector is connected to the second Ethernet port 22 of the indoor network sharing device 20. In this way, in this embodiment of the instant disclosure, through the high-speed Ethernet transmission cable 30 in combination with the RJ45 connectors supporting the Ethernet and Ethernet ports, the high-frequency network transceiver module 11 of the outdoor wireless transceiver device 10 can, after receiving the high-frequency network signal H, transmit the high-frequency network signal H from the first Ethernet port 12 to the indoor network sharing device 20 through the high-speed Ethernet transmission cable 30 at a transmission rate above 1 Gbps, thereby achieving a high transmission efficiency with respect to the high-frequency network signal H (for example, a 5G signal, or a 802.11ax or 802.11ad signal).

In addition, as shown in FIG. 4, the high-speed Ethernet transmission cable 30 is provided with at least one flat cable segment 311. The flat cable segment 311 is a flat cable with a thickness less than 4 mm. In some embodiments, the thickness of the flat cable segment 311 may be in a range of 1 mm to 4 mm. Alternatively, the flat cable segment 311 may be a flexible cable, for example, a flexible flat cable (FFC) or a flexible printed circuit (FPC), and the thickness of the flat cable segment 311 composed thereby is less than 1 mm. In this embodiment, the entire cable of the high-speed Ethernet transmission cable 30 is the flat cable segment 311, but the instant disclosure is not limited thereto. In other embodiments, alternatively, only a part of the high-speed Ethernet transmission cable 30 may be the flat cable segment 311.

Figure 5:
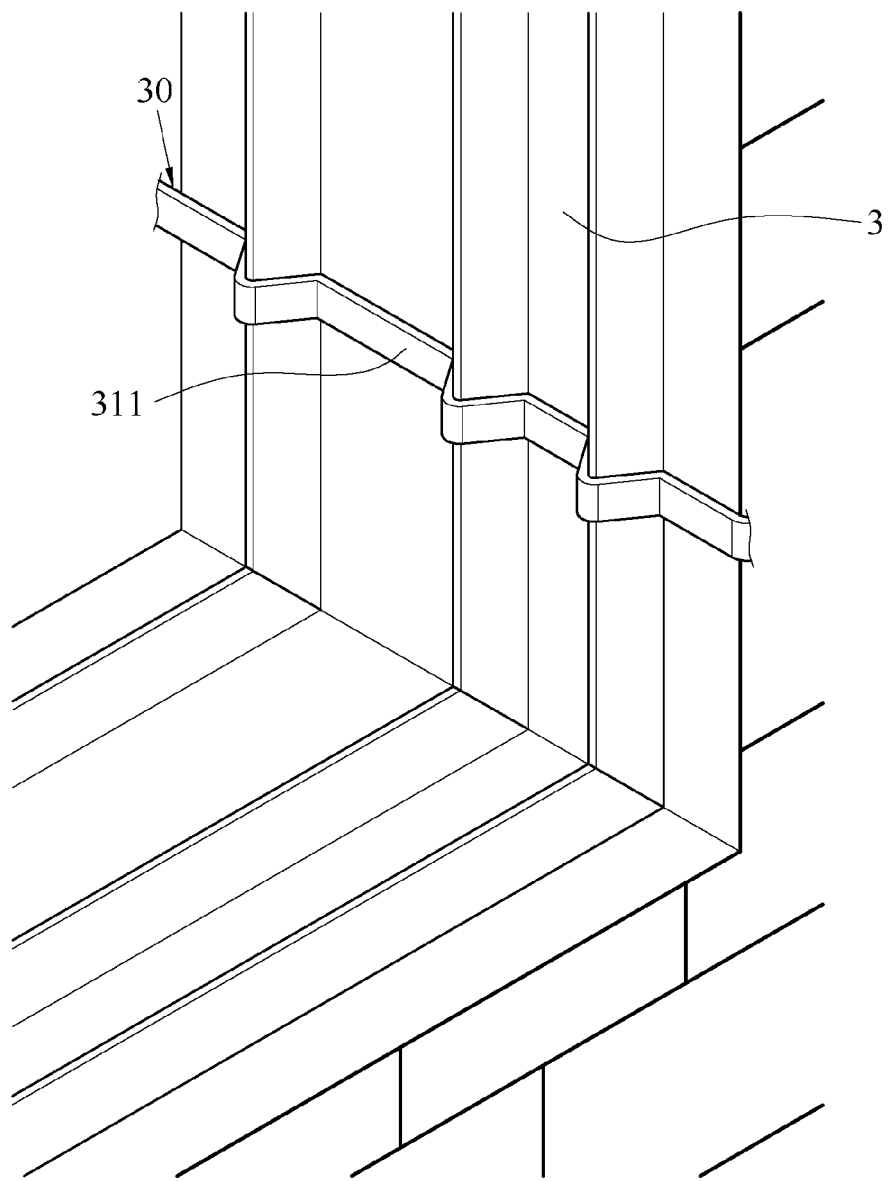
FIG. 5 is a schematic wire installation diagram of a network sharing system according to an embodiment of the instant disclosure.

In this way, the high-speed Ethernet transmission cable 30 is provided with the flat cable segment 311, so that the high-speed Ethernet transmission cable 30 can directly pass through a door or window to connect the outdoor wireless transceiver device 10 and the indoor network sharing device 20 and the door or window can be opened or closed normally. Therefore, extra construction (for example, breaking the door or window, or drilling a wall) is not needed, thereby reducing the costs and maintaining the esthetic appearance of the indoor decorations. For example, referring to FIG. 1, FIG. 2, FIG. 4, and FIG. 5, in this embodiment, the second RJ45 connector 33 at one end of the high-speed Ethernet transmission cable 30 may be connected to the second Ethernet port 22 of the indoor network sharing device 20, the first RJ45 connector 32 at the other end of the high-speed Ethernet transmission cable 30 may directly pass through the window 2 to be connected to the first Ethernet port 12 of the outdoor wireless transceiver device 10, and the flat cable segment 311 may be configured according to a shape of a window frame 3 of the window 2 (as shown in FIG. 5). The flat cable segment 311 is thin and therefore a sealing function can still be achieved after window 2 is closed and the original function of the window 2 is not affected.

As shown in FIG. 1, in some embodiments, the indoor network sharing device 20 may be a DSL modem, a gateway, or a router. The processing module 21 may, after receiving the high-frequency network signal H through the second Ethernet port 22, set up a wireless local area network (Wireless LAN) or/and a wired local area network (Wired LAN), to enable a communications device (for example, a notebook computer, a smartphone, or a tablet computer) within a specific range to be connected to the indoor network sharing device 20 in a wired or wireless manner, so as to be connected to the Internet. In some embodiments, the processing module 21 may be a Central Processing Unit (CPU), a Micro Control Unit (MCU), or a Micro Processing Unit (MPU).

In some embodiments, the outdoor wireless transceiver device 10 and the indoor network sharing device 20 may be arranged adjacent to each other, to reduce a cable material used by the high-speed Ethernet transmission cable 30 so as to reduce costs and further reduce signal attenuation. For example, as shown in FIG. 2, in this embodiment, the outdoor wireless transceiver device 10 and the indoor network sharing device 20 are installed on inner and outer surfaces of a same position of the window 2 to be adjacent to each other. In other embodiments, the outdoor wireless transceiver device 10 and the indoor network sharing device 20 may alternatively be respectively installed on different objects, but the instant disclosure is not limited thereto.

In an embodiment, the indoor network sharing device 20 may be connected to a power supply. For example, the power supply may be a battery disposed inside the indoor network sharing device 20, to generate a power signal to provide power needed by the indoor network sharing device 20. In addition, the processing module 21 may further transmit the power signal to the outdoor wireless transceiver device 10 through the high-speed Ethernet transmission cable 30, so as to simultaneously provide power needed by the outdoor wireless transceiver device 10. In this way, the outdoor wireless transceiver device 10 neither needs to be provided with a battery nor be connected to the mains through a power supply lead, thereby achieving advantages such as reduced costs and easy installation. As shown in FIG. 4, in an embodiment, the power supply may alternatively be an external battery, the mains, or another power supply device, and the indoor network sharing device 20 may be connected to the power supply through a power supply lead 23, to receive a power signal and transmit the power signal to the outdoor wireless transceiver device 10 through the high-speed Ethernet transmission cable 30.

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A network sharing system, comprising:
    an outdoor wireless transceiver device, comprising a high-frequency network transceiver module and a first Ethernet port, wherein the high-frequency network transceiver module is connected to the first Ethernet port and is configured to receive a high-frequency network signal, wherein the high-frequency network transceiver module is a 5G transceiver module, or a 802.11ax or 802.11ad transceiver module;
    an indoor network sharing device, comprising a processing module and a second Ethernet port, wherein the processing module is connected to the second Ethernet port, wherein the indoor network sharing device is a DSL modem, a gateway, or a router; and
    a high-speed Ethernet transmission cable, having a transmission rate above 1 giga bits per second (Gbps), wherein two ends of the high-speed Ethernet transmission cable are respectively connected to a first RJ45 connector and a second RJ45 connector, the high-speed Ethernet transmission cable is provided with at least one flat cable segment, the first RJ45 connector is connected to the first Ethernet port, the second RJ45 connector is connected to the second Ethernet port, and the high-speed Ethernet transmission cable is a flexible cable,
    wherein the indoor network sharing device is further connected to a power supply, the power supply outputs a power signal, and the processing module receives the power signal and transmits the power signal to the outdoor wireless transceiver device through the high-speed Ethernet transmission cable.

2. The network sharing system according to claim 1, wherein a thickness of the at least one flat cable segment is less than 4 mm.

3. The network sharing system according to claim 1, wherein the outdoor wireless transceiver device and the indoor network sharing device are arranged adjacent to each other.

4. The network sharing system according to claim 1, wherein the indoor network sharing device is further provided with a nano tape, the nano tape is provided with a bonding surface and an absorption surface opposite to each other, and the bonding surface is fixedly disposed on a surface of the indoor network sharing device.

5. The network sharing system according to claim 1, wherein the indoor network sharing device is installed on a fixing member, the fixing member is provided with a stop portion, and the indoor network sharing device abuts against the stop portion to be positioned.

6. The network sharing system according to claim 5, wherein the fixing member comprises a back plate, the back plate is provided with a fixing surface, and the fixing surface is provided with a nano tape.

* * * * *